United States Patent [19]

Buchmayer

[11] 4,265,421

[45] May 5, 1981

[54] INSTRUMENT STAND

[75] Inventor: Ludwig Buchmayer, Au, Switzerland

[73] Assignee: Wild Heerbrugg Aktiengesellschaft, Heerbrugg, Switzerland

[21] Appl. No.: 28,709

[22] Filed: Apr. 10, 1979

[30] Foreign Application Priority Data

Apr. 19, 1978 [CH] Switzerland .................... 4212/78

[51] Int. Cl.³ ............................................. F16M 11/16
[52] U.S. Cl. ..................................... 248/188; 403/366
[58] Field of Search ................ 403/25, 196, 234, 256, 403/273, 366, DIG. 8, 292, 293, 298, 361, 378, 379, 368, 369, 370, 371; 248/188, 188.1, 163

[56] References Cited

U.S. PATENT DOCUMENTS

| 183,425 | 10/1876 | Smith | 403/378 X |
|---|---|---|---|
| 430,176 | 6/1890 | Reagan et al. | 403/368 |
| 1,054,063 | 2/1913 | Warren | 403/368 X |
| 1,440,801 | 1/1923 | Shoemaker | 403/379 X |
| 1,662,610 | 3/1928 | Hokanson | 403/379 X |
| 2,446,542 | 8/1948 | MacInnes | 403/378 X |
| 2,517,700 | 8/1950 | Odin | 403/367 X |
| 3,874,360 | 4/1975 | Armstrong | 403/306 X |

FOREIGN PATENT DOCUMENTS 870861  5/1971  Canada ...................... 403/295

Primary Examiner—J. Franklin Foss
Attorney, Agent, or Firm—Frishauf, Holtz, Goodman & Woodward

[57] ABSTRACT

In order to secure the ends of the legs for the stand in the leg ferrule caps so that they are not loosened readily by shrinkage of the wooden leg material, the legs have a number of spacing pins extending crosswise through them where they are clamped. The pins are of a material which is more rigid than the wood of the legs themselves and are thus subjected to a greater clamping pressure. As a result of the orientation of the pins, perpendicular to the axis of the legs but angularly displaced from each other, the legs are held securely with their longitudinal axis remaining in the initial clamping position even after shrinkage of the leg wood. A particular clamping device utilizing a wedge is also described.

7 Claims, 2 Drawing Figures

INSTRUMENT STAND

BACKGROUND OF THE INVENTION

The invention relates to a stand having legs formed by rods and having also a mounting plate to which instruments can be fastened.

The construction of such stands is known. Stands for instruments, especially geodetic instruments, must be very stable. This puts great demands on the connections of the individual legs. Especially critical are the connections of the stand legs with the leg ferrules, or caps, which are fastened to the mounting plate so that they pivot.

In common commercially available stands, the leg rods are fastened in the leg caps with screws, wedges, segments, or a combination of such.

These types of connections have the disadvantage that from time to time they must be retightened, since a change, such as a shrinking of the usually wooden legs, can lead to play. If the connections are not timely retightened, erroneous measurements can result.

It is an object of the invention to improve the fastening of the leg rods of an instrument stand in the leg caps in such a manner that the functional security of the stand is at all times assured without later retightening of the connection elements.

SUMMARY OF THE INVENTION

The novel stand in accordance with the present invention includes spacing pins of an inherently dimensionally stable material with a greater rigidity than the leg rods. These are inserted in the leg rods in different directions in such a way that they lie in the region of the clamping device with which the leg rods are clamped in the leg caps. These spacing pins are in contact with the clamping device and the leg cap.

The advantage of the stand in accordance with the invention lies in that the usually wooden leg rods remain rigidly clamped in the leg caps despite shrinking of the wood. The stand is thereby maintenance-free and suited for use by inexperienced personnel.

DESCRIPTION OF THE PREFERRED EMBODIMENT

Figure 1:
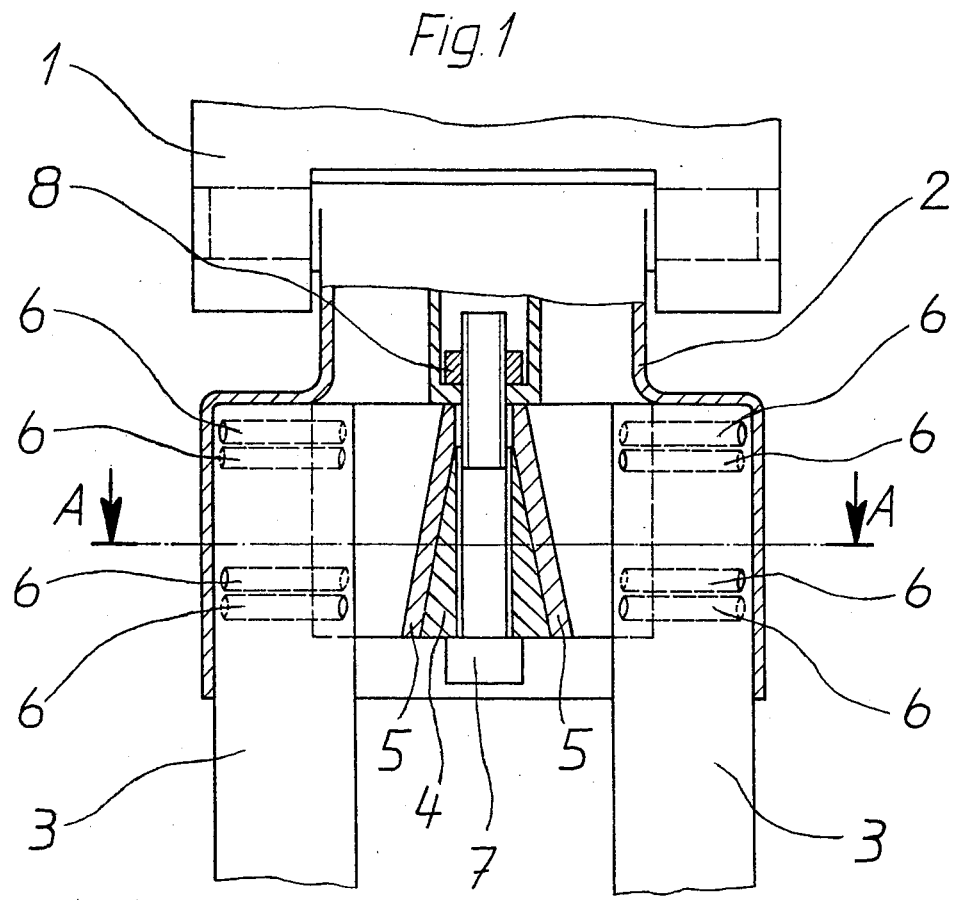
FIG. 1 is a partial longitudinal section of a clamping device holding leg rods in a leg cap of a stand in accordance with a preferred embodiment of the present invention.
Figure 2:
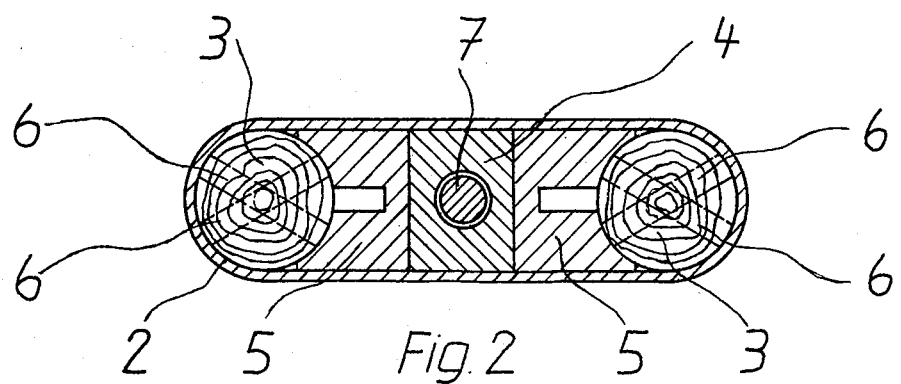
FIG. 2 is a cross-section of the leg cap of the stand of FIG. 1 taken along the section line A—A of FIG. 1.

Referring now to the preferred embodiment shown in the FIGS. 1 and 2, the stand has a mounting plate 1 to which there is fastened a leg cap 2 so that it can pivot. The stand mounting plate 1 is shown only in part. The leg rods 3 are clamped in the leg cap 2 by means of a clamping device which includes a wedge 4, thrust pieces 5, a bolt 7, and a nut 8. A number of spacing pins 6 are inserted through the leg rods 3 in different directions through holes provided therein for that purpose. The spacing pins 6 can have a cross-section which is round, elliptical, square, or otherwise polygonal. The leg rods 3 are provided with holes which serve for accepting these spacing pins 6 and have a corresponding cross-section. The spacing pins 6 can have a predetermined angle to one-another, as is shown e.g. in FIG. 2. If the leg rods 3 have a square or hexagonal cross-section, then the spacing pins 6 must be adapted accordingly. The spacing pins 6 of FIGS. 1 and 2 are shown as having a round cross-section to form cylindrical pins or dowels.

Upon tightening of the bolt, the thrust pieces 5 are thrust outward by toward the wooden leg rods 3 by the wedge 4, so that one end of the pins 6 is in close contact with the thrust pieces 5, while the other end of the pins 6 is in close contact with the opposite inner wall surface of the leg cap 2. The spacing pins 6 are made of a material which is inherently dimensionally stable and has a greater rigidity than does the wooden material of the leg rods 3. Included as material suitable for the spacing pins 6 is steel, brass, or glass fiber-reinforced synthetic resin. As a result of the particular arrangement of the spacing pins 6 in the leg rods 3, excessive squeezing together of the leg rods is avoided. By means of the pins 6, the longitudinal axis of the leg rods 3 is rigidly fixed within the leg cap 2 and remains at its location even when the diameter of the leg rods 3 changes as a result of shrinkage. The leg rods 3 thereby are clamped rigidly in the leg cap 2 in a lasting manner.

The spacing pins 6 perform their function by transmitting a greater amount of clamping or compression force per unit cross-section between a pair of opposed clamping surfaces than does the material of the leg rods 3. Thus, it is only in their longitudinal direction that they need to be more rigid than the leg rods 3. The most effective configuration for the pins is a hollow or solid cylinder segment, since then the transmitted forces are pure compression in the pins 6. By "cylinder" is meant any geometrical shape generated by parallel lines. Thus the pins 6 can have any cross-sectional configuration desired. For round leg rods 3 they must pass perpendicularly through the longitudinal axis of the leg rods 3. The ends of the pins 6 must be oriented substantially perpendicular to the clamping surfaces in contact with them and appropriately contoured, so that there is no torque on the pins 6. Therefore, the pins 6 will generally be perpendicular to the axis of the leg rods 3. In the case of leg rods with a square cross-section which are clamped between two clamping surfaces against opposite sides, the pins should be perpendicular to both sides and need not pass through the axis to avoid a torque. Similar considerations apply for other configurations of leg rods and clamping devices therefore.

I claim:

1. Instruments support stand having
   a mounting plate (1);
   a leg cap (2) rotatably secured to the mounting plate;
   at least one leg rod (3) received within the leg cap;
   a clamping means (4, 5, 7, 8) effecting clamping connection of the at least one leg rod within the leg cap, and pressing the respective leg rod against the leg cap,
   and comprising, in accordance with the invention
   a plurality of spacing and reinforcing pins (6) extending within the portion of the leg rod which is subjected to clamping force by the clamping means,
   said pins being of a material having inherently stable dimensions and being more rigid in their longitudinal direction than the material of which the leg rods are made, said pins being in close contact at one end with, and perpendicular to the surfaces between which the leg is clamped by the clamping means;

2. The stand according to claim 1 wherein the legs are of wood and said pins are of metal.

3. The stand according to claim 1 wherein said pins have the shape of a cylinder.

4. The stand according to claim 3 wherein said pins have a round cross-section.

5. The stand according to claim 1 wherein said pins have a polygonal cross-section.

6. Stand according to claim 1 wherein the pins (6) of the plurality of pins are staggered longitudinally along the leg rod within the region of the clamping means.

7. Stand according to claim 1 or 6 wherein the pins of the plurality of pins extend at an angle with respect to each other.

* * * * *